(12) United States Patent
Tassy

(10) Patent No.: US 12,296,748 B2
(45) Date of Patent: May 13, 2025

(54) LIGHT GUIDE FOR THE ILLUMINATION OF A PASSENGER COMPARTMENT OF A MOTOR VEHICLE

(71) Applicant: VALEO VISION, Bobigny (FR)

(72) Inventor: Pierre-Louis Tassy, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/685,101

(22) PCT Filed: Aug. 2, 2022

(86) PCT No.: PCT/EP2022/071606
§ 371 (c)(1),
(2) Date: Feb. 20, 2024

(87) PCT Pub. No.: WO2023/030800
PCT Pub. Date: Mar. 9, 2023

(65) Prior Publication Data
US 2024/0359620 A1    Oct. 31, 2024

(30) Foreign Application Priority Data

Sep. 2, 2021    (FR) ...................... 2109195

(51) Int. Cl.
*B60Q 3/64* (2017.01)
*B60Q 3/74* (2017.01)
*F21V 8/00* (2006.01)

(52) U.S. Cl.
CPC ............... *B60Q 3/64* (2017.02); *B60Q 3/74* (2017.02); *G02B 6/0038* (2013.01); *G02B 6/0068* (2013.01); *G02B 6/0073* (2013.01)

(58) Field of Classification Search
CPC .......... B60Q 3/64; B60Q 3/74; G02B 6/0038; G02B 6/0068; G02B 6/0073
See application file for complete search history.

(56) References Cited

U.S. PATENT DOCUMENTS

2021/0180760 A1    6/2021  Aubert et al.
2021/0310628 A1    10/2021 Li et al.

FOREIGN PATENT DOCUMENTS

| DE | 10 2011 016 433 A1 | 10/2012 |
| EP | 2 354 637 A2 | 8/2011 |
| EP | 3 872 394 A1 | 9/2021 |
| FR | 2 939 868 A1 | 6/2010 |
| JP | 2009-048939 A | 3/2009 |
| JP | 2011-76858 A | 4/2011 |

(Continued)

OTHER PUBLICATIONS

Hoelen et al., CN 1639595, Jul. 2005 (Year: 2005).*

(Continued)

*Primary Examiner* — Mary Ellen Bowman
(74) *Attorney, Agent, or Firm* — Oblon, McClelland, Maier & Neustadt, L.L.P.

(57) ABSTRACT

A light guide for the illumination of a passenger compartment of a motor vehicle includes a light inlet portion and a light outlet portion. The light inlet portion includes at least two light inlet faces and the light outlet portion includes at least two light outlet faces. The light inlet portion has at least one slot disposed between two light inlet faces, a groove separating two light outlet faces extending in the continuation of this slot.

18 Claims, 3 Drawing Sheets

(56) References Cited

FOREIGN PATENT DOCUMENTS

Figure 1:
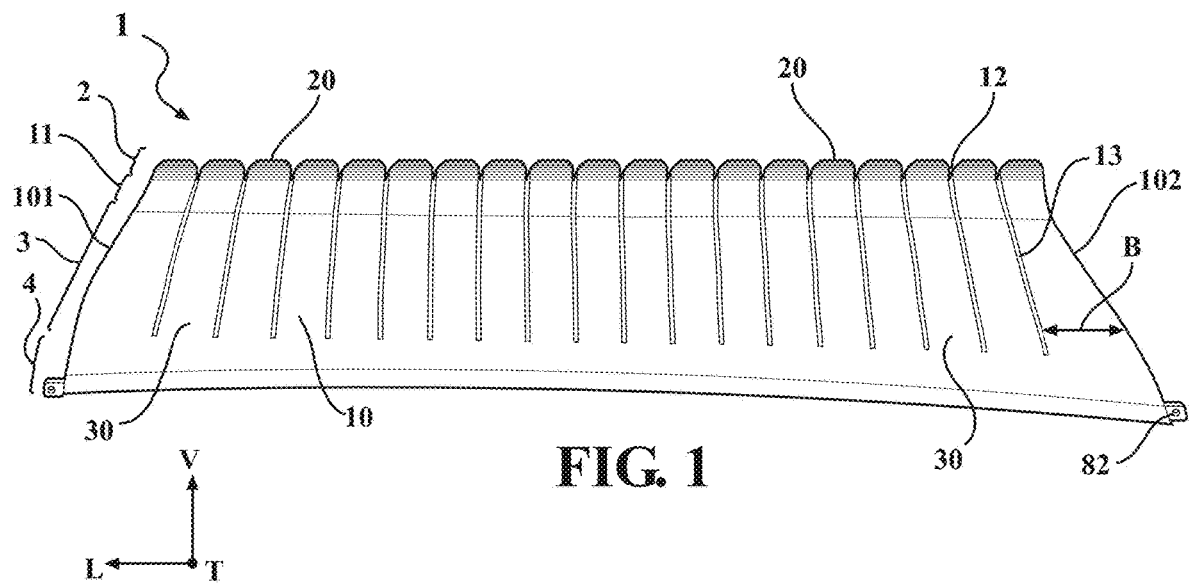

| JP | 2014-127413 A | 7/2014 |
|----|---------------|--------|
| JP | 2018-120683 A | 8/2018 |
| WO | WO 2020/043443 A1 | 3/2020 |
| WO | WO 2021/136235 A1 | 7/2021 |

OTHER PUBLICATIONS

Muegge et al., EP 2354637, Aug. 2011 (Year: 2011).*
Thorailler et al., FR 2938804, May 2010 (Year: 2010).*
International Search Report & Written Opinion issued Oct. 13, 2022 in PCT/EP2022/071606, filed on Aug. 2, 2022, 16 pages (With English Translation).

* cited by examiner

LIGHT GUIDE FOR THE ILLUMINATION OF A PASSENGER COMPARTMENT OF A MOTOR VEHICLE

The present invention relates to the field of lighting and/or light signaling, and more particularly to the lighting of a motor vehicle passenger compartment.

Such interior lighting may be provided by light guides, which are components inside which rays of light travel, in a controlled manner, from an entry face near which a light source is located to an exit face at which the rays of light emerge. Within the light guide, the propagation of the light rays is controlled in particular by internal reflections off different faces of the light guide.

Light guides may adopt various geometric forms, thus meeting a variety of esthetic requirements. Light guides make it possible for example to light hard-to-reach areas of the passenger compartment of the vehicle.

The light sources are generally positioned on a printed circuit board, thus forming a linear and discrete-point light source. However, it is difficult, with such a linear and discrete-point light source, to achieve dynamic or evolving lighting effects. Specifically, the light emanating from a given light source may interfere with the light emanating from the adjacent light source. Since the light guide has a significant surface area to illuminate, such interferences detract from the performance of the dynamic or evolving lighting effect, for example causing its sharpness to worsen with increasing distance away from the light sources, or else by creating zones in which the intensity of this lighting is lower, or even where lighting is absent.

One solution that the invention envisions for overcoming these technical difficulties is that of creating cavities, and more specifically slots and grooves, within the light guide. The presence of such cavities makes it possible to obtain lighting that is more uniform over the entirety of the exit face and contributes to avoiding the propagation of light from faces of the light guide other than this exit face. The pair formed by a slot and by a groove has the essential aim of channeling the light emitted by a source predominantly toward a single exit surface. A slot and a groove differ from one another notably in that the slot is open at both ends, which is to say passes all the way through the light guide, whereas the groove is blind and therefore open onto just one exit face of this light guide.

The main subject of the present invention is therefore a light guide for lighting a motor vehicle passenger compartment, comprising a light entry portion and a light exit portion, the light entry portion comprising at least two light entry faces and the light exit portion comprising at least two light exit faces. According to the invention, the light entry portion has at least one slot positioned between two light entry faces, a groove separating two light exit faces extending in the continuation of this slot.

Such a light guide therefore has a light entry portion via which light rays enter the light guide, and a light exit portion via which they exit it, the light exit portion being positioned in the continuation of the light entry portion. More specifically, these light rays enter the light guide via at least two light entry faces of the light entry portion, and exit it via at least two light exit faces of the light exit portion. Within the light entry portion, two adjacent light entry faces are separated by a slot. Likewise, within the light exit portion, two adjacent light exit faces are separated by a groove, this groove extending in the continuation of the slot.

The presence of slots and grooves creates air gaps within the surface of the light guide, and these prevent the leaking of light rays, such that these are propagated over the entire exit portion, and more particularly over regions of the exit portion that are furthest from the entry portion. Such a configuration makes it possible to contain the light rays in a specific portion of the light guide, here a strip.

According to one feature, the light entry portion and the light exit portion extend in intersecting planes. It will be understood that if the light exit portion has a curved surface, all of the planes in which the tangents to the curved surface of this light exit portion extend intersect the plane of the light entry portion, whether such a curvature of the surface of the light exit portion is considered in a longitudinal direction or a vertical direction of the light guide.

According to one feature of the invention, the light guide comprises a succession of strips, each strip being delimited by a light entry face and at least one light exit face.

The light guide is thus formed of strips aligned in a main direction of elongation of the light guide which corresponds to its longitudinal direction. Each strip is delimited, at a first end in the vicinity of the light entry portion, by a light entry face and, at a second end in the vicinity of the light exit portion, by at least one light exit face.

According to another feature of the invention, at least one strip widens from the light entry face toward the light exit face.

Most of the strips that form the light guide are substantially trapezoidal, these strips having a shape that widens as mentioned hereinabove. It will be appreciated that they therefore have dimensions, measured in the longitudinal direction of the light guide, that are narrower at their light entry face, and dimensions that are wider at their light exit face, likewise measured in the longitudinal direction of the light guide. Moreover, the strips are not necessarily of constant thickness. The light guide may also be made up of strips of which the ends in the longitudinal direction are slightly curved.

According to one feature of the invention, the light guide comprises a bent portion between the light entry portion and the light exit portion.

This bent portion provides the connection between the light entry portion and the light exit portion, which portions are therefore located in intersecting planes. Because of this bent portion, and more particularly if this portion forms a right angle, the light entry face and the light exit face are substantially parallel.

According to another feature of the invention, the light guide comprises a plurality of slots, each one positioned between two light entry faces, these slots being positioned at regular intervals in a main direction of elongation of the light guide.

It will be understood that in the main direction of elongation of the light guide, that is, along its longitudinal dimension, slots are positioned uniformly along the light guide. These slots are positioned between two light entry faces, each light entry face corresponding to one strip of the light guide.

According to another feature, the light guide comprises a plurality of grooves, each one positioned between two light exit faces, at least a plurality of these grooves being positioned at regular intervals in the main direction of elongation of the light guide.

Like the slots, the grooves are positioned uniformly along the light guide, along the entire longitudinal dimension thereof. These grooves separate two adjacent light exit faces and therefore contribute to delimiting the strips of the light guide.

According to one feature of the invention, at least one slot passes through the light entry portion from an upper face of the light entry portion to a lower face of the light entry portion, this upper face and this lower face being joined by the light entry face.

Thus, at least one slot passes through the light entry portion from one side to the other, that is, from an upper face of the light entry portion to a lower face of the light entry portion. It will be appreciated that, where a plurality of such slots are present, this feature may apply to all of these slots.

According to another feature of the invention, the grooves extend over at least one third of a thickness of the light exit portion, this thickness being measured between the light exit face and a reflection face of the light exit portion that is opposite this first light exit face.

The grooves therefore correspond to a depression in the light exit portion, this depression corresponding to at least one third of the thickness of the light exit portion. In other words, the grooves have a depth corresponding to at least one third of the thickness of the light exit portion. This light exit portion is delimited by the light exit face at one end thereof, and by the reflection face at the other end thereof.

According to one feature of the invention, the slots and the grooves delimit strips, at least two adjacent strips being connected by at most one third of the thickness of the light exit portion.

It will therefore be appreciated that there is complementarity between the depth of the grooves and the thickness of the light exit portion that connects two strips of the light guide.

Such a thickness of the light exit portion that connects two strips can for example be three millimeters.

According to one feature, the light guide has a zone that is free of grooves and extends in a continuation of the light exit portion.

According to one feature of the invention, within the light entry portion, the light entry face connects an upper face and a lower face, this upper face of the light entry portion having a mixing means configured to mix the rays of light entering via the light entry face.

It will be appreciated that the upper and lower faces concerned correspond to the upper and lower faces between which the slots extend.

When the rays of light come from light sources which are made up of light-emitting diodes of different colors, these colors need a certain distance within the light guide in order to be able to mix, so as to yield other colors, particularly white. Such a mixing means makes it possible to improve this mixing of the light rays within a reduced amount of space.

According to another feature, the mixing means comprises a succession of bands which, when viewed from the outside of the light guide, are concave or convex, and are lined up in succession starting from the light entry face.

This particular shape of the bands helps to improve the uniformity of the light rays despite the short propagation distance. They are therefore strategies aimed at reducing the distance needed for the mixing of the colors, by fragmenting the propagation modes. The overall size of the light guide is thus reduced, making it easier to install in a vehicle.

According to one feature of the invention, the light exit face is opposite a reflection face, this reflection face having a decoupling structure.

It will be appreciated that this reflection face is the same as the one used for delimiting the thickness of the light exit portion. Such a decoupling structure is a device that modifies the angle of incidence of the light rays, which has the effect of directing them toward a determined location, in this instance toward the light exit face. The decoupling structure also allows uniform lighting of the light exit portion irrespective of the distance from the light entry portion, such uniformity being obtained by varying the geometry of the decoupling structure.

According to one feature of the invention, the decoupling structure comprises at least a plurality of prisms and/or a plurality of spheres and/or a graining and/or a diffractive structure and/or white paint.

These various embodiments of the decoupling structure may be used in isolation or together.

According to another feature of the invention, the decoupling structure is distributed over the reflection face in a direction of elongation of the strip and a direction perpendicular to this direction of elongation.

The decoupling structure is distributed over the reflection face at various zones of this reflection face, each zone corresponding to a particular position and to a particular orientation of the decoupling structure. For example, if the decoupling structure comprises prisms, these prisms are distributed over the reflection face in a plurality of zones. The prisms of the one same zone will have one particular orientation, which will correspond to a direction of elongation of the strip and to a direction perpendicular to this direction of elongation.

According to a feature of the invention, the light guide is produced from a material configured to conduct the rays of light by internal transmission inside the light guide.

It will thus be appreciated that the material from which the light guide is made is a transparent or translucent material. Such a material can in particular be plexiglass or polycarbonate.

The invention also relates to a lighting device comprising a printed circuit board which bears a plurality of light sources, each of the light entry faces of a light guide as described hereinabove being positioned facing at least one light source.

Such an arrangement of the light sources allows the light rays emitted by these light sources to enter the light guide via its light entry faces. A ray of light emitted by a given light source enters the light guide via one of the light entry faces and exits this light guide via an associated light exit face.

According to one feature of the invention, at least one of the light sources comprises RGB light-emitting diodes.

These RGB light-emitting diodes are a collection of monochrome diodes capable of producing rays of light of a single color, notably red, green and blue. These colors may be mixed to form other colors, and notably rays of white light.

The invention moreover relates to a motor vehicle interior panel comprising a support and a trim, a lighting device as described hereinabove being positioned between this support and this trim, the exit portion of the light guide being positioned facing the trim.

Thus, the lighting device is positioned between the panel support and the trim. The exit portion of the light guide, which is the portion via which the rays of light exit the light guide, is covered by the trim.

According to one feature of the invention, the trim has at least one pattern rendered visible by illuminating at least one of the light sources.

It will thus be appreciated that illuminating at least one light source emits rays of light which render the pattern visible through the trim.

Figure 2:
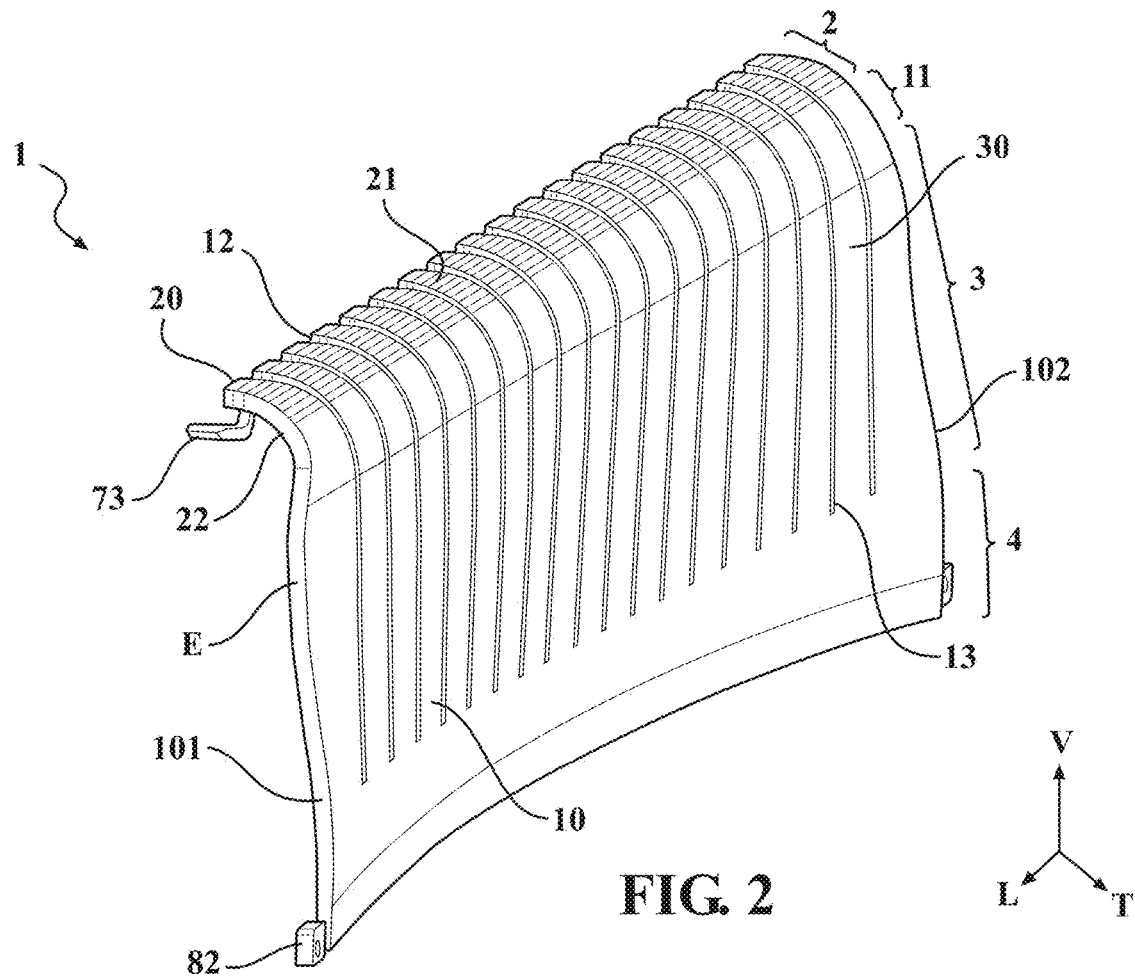
Figure 3:
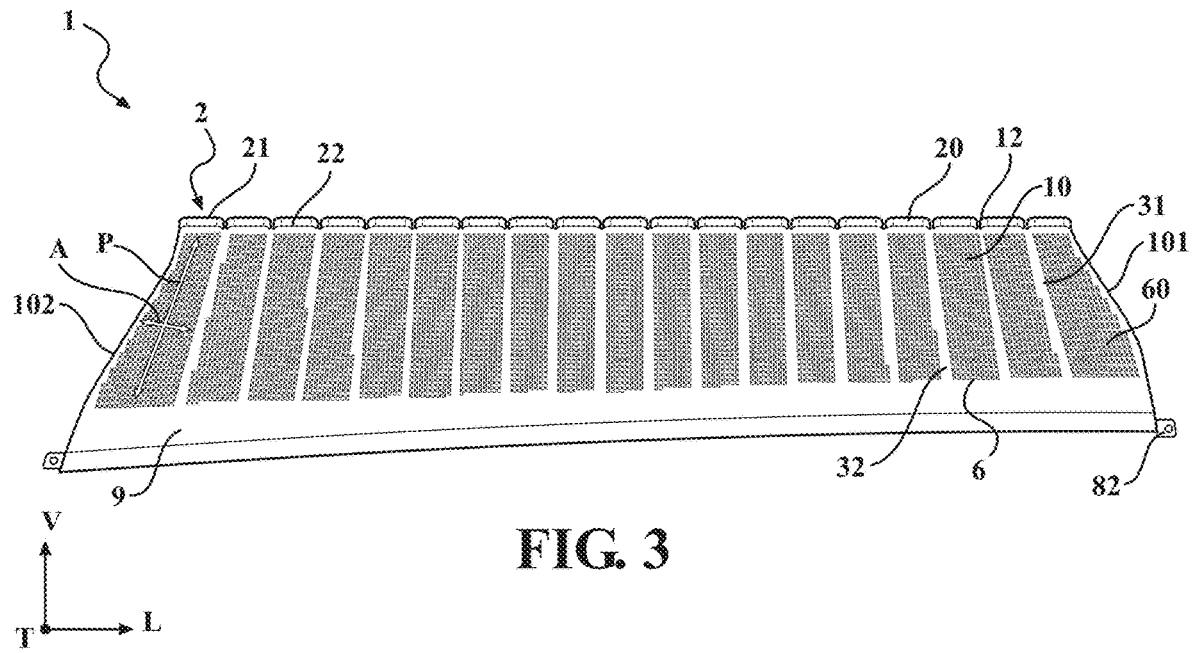
Figure 4:
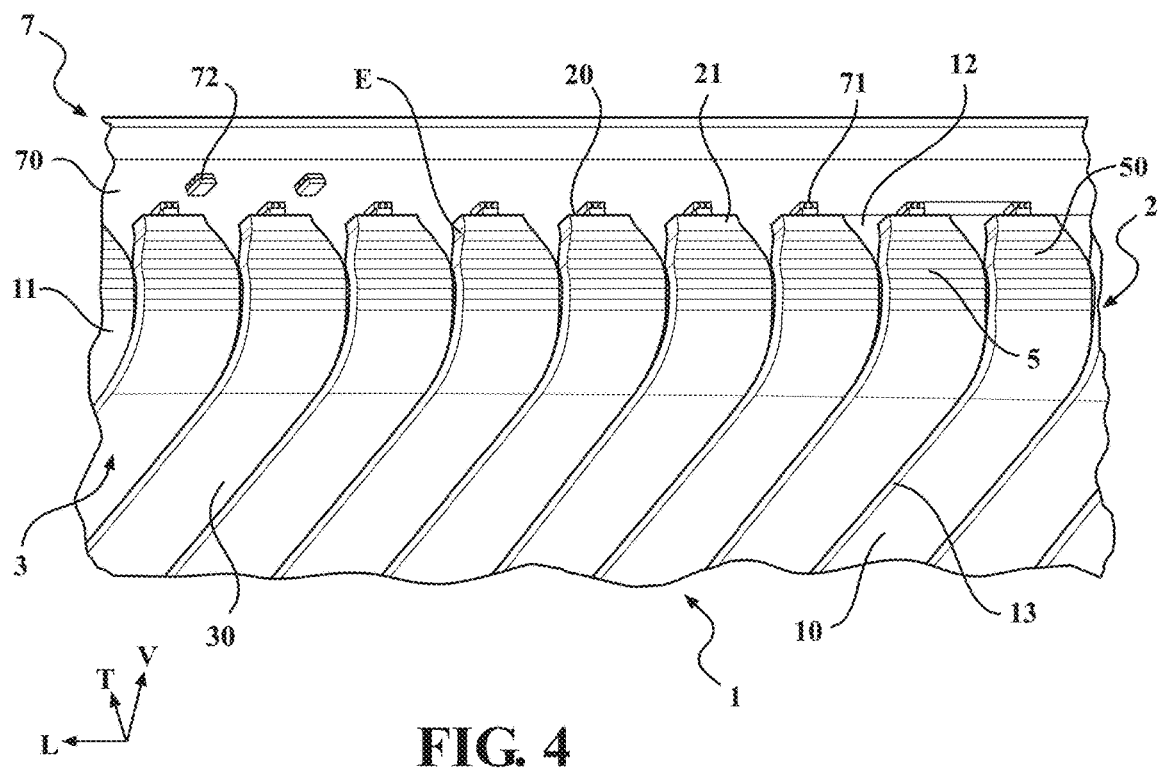
Figure 5:
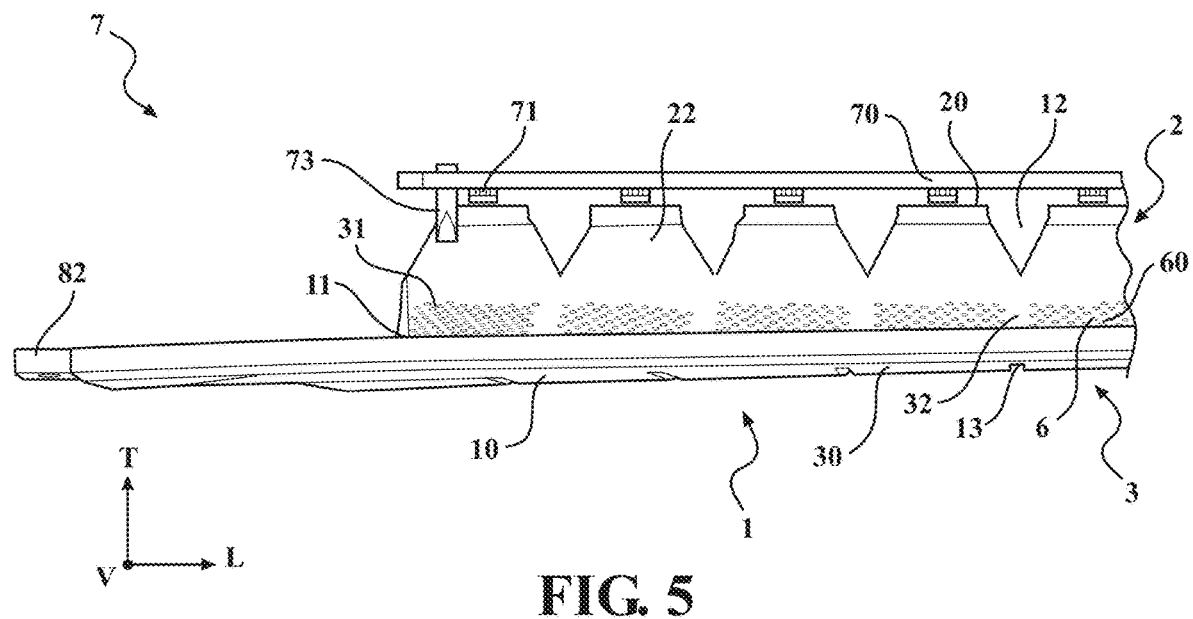
Figure 6:
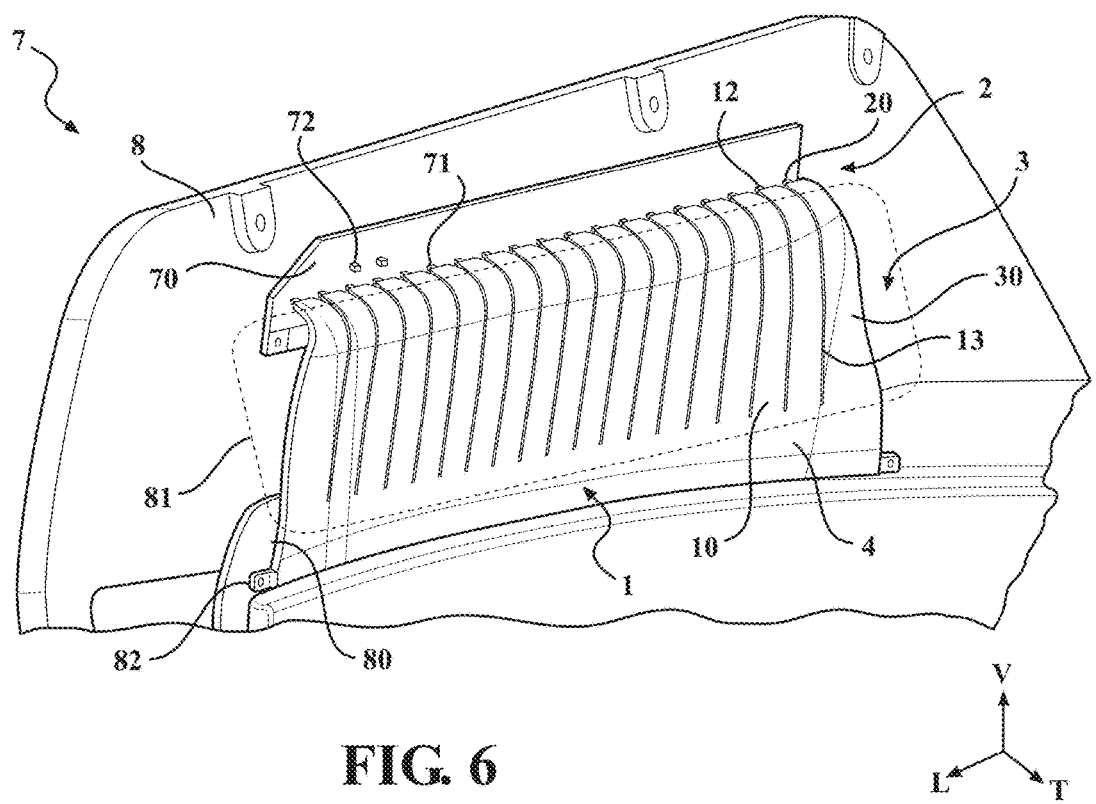

Other features, details and advantages of the invention will become more clearly apparent on reading the following description, on the one hand, and exemplary embodiments given by way of nonlimiting indication with reference to the accompanying drawings, on the other hand, in which drawings:

FIG. 1 schematically illustrates a front view of a light guide according to the invention;

FIG. 2 is a perspective view of the light guide of FIG. 1;

FIG. 3 schematically illustrates a rear view of the light guide of FIG. 1;

FIG. 4 is a perspective view of a lighting device comprising the light guide of FIG. 1;

FIG. 5 schematically illustrates the lighting device of FIG. 4, viewed from beneath;

FIG. 6 is a perspective view of a motor vehicle interior panel comprising the lighting device of FIG. 4.

The features, variants and different embodiments of the invention may be associated with one another in different combinations, where not incompatible with one another or mutually exclusive. Notably, variants of the invention that include only a selection of the features described below separately from other described features are also possible, provided that this selection of features is sufficient to provide a technical advantage and/or to differentiate the invention from the prior art.

In the figures, elements common to several figures have the same reference sign.

In the following detailed description, the terms "longitudinal", "transverse" and "vertical" refer to the orientation of a light guide according to the invention. A longitudinal direction corresponds to a main direction of elongation of the light guide, this longitudinal direction being parallel to a longitudinal axis L of a coordinate system L, V, T illustrated in the figures. A transverse direction corresponds to the direction of alignment of a light entry face and of a light exit face, this transverse direction being parallel to a transverse axis T of the coordinate system L, V, T and this transverse axis T being perpendicular to the longitudinal axis L. Finally, a vertical direction corresponds to a direction parallel to a vertical axis V of the coordinate system L, V, T, this vertical axis V being perpendicular to the longitudinal axis L and to the transverse axis T.

FIGS. 1 and 2 are, respectively, a front view and a perspective view of a light guide 1 according to the invention. This light guide 1 is configured to light the passenger compartment of a motor vehicle, such lighting preferably having a dynamic or evolving effect. The light guide 1 is made from a material configured to convey the light rays by internal transmission to this light guide 1. Such a material, which is transparent or translucent, can for example be plexiglass or polycarbonate. The light guide 1 extends mainly in a longitudinal direction and, in a view from the front such as that visible in FIG. 1, is substantially trapezoidal in shape.

The light guide 1 comprises a light entry portion 2 and a light exit portion 3, this light exit portion 3 being in the continuation of the light entry portion 2. The light entry portion 2 and the light exit portion 3 are connected by a bent portion 11 and are therefore, in this instance, positioned in intersecting planes.

The light exit portion 3 may have a curvature in a longitudinal direction and/or in a vertical direction. It will be appreciated that, if the surface of the light exit portion 3 is not substantially planar but has a curvature, the planes in which the tangents to this curvature extend will intersect the plane in which the light entry portion 2 extends. According to the embodiment illustrated in the figures, the light entry portion 2 extends mainly in a longitudinal/transverse plane, while the light exit portion 3 extends mainly in a longitudinal/vertical plane. Of course, the invention covers the situation in which the light entry portion 2 extends longitudinally while being inscribed in a curve around the longitudinal direction L. Alternatively or additionally, the light entry portion 2 extends longitudinally while being inscribed in a curve around the transverse direction T.

The invention covers the situation in which the light exit portion 3 extends longitudinally while being inscribed in a curve around the longitudinal direction L. Alternatively or additionally, the light exit portion 3 extends longitudinally while being inscribed in a curve around the vertical direction V.

The light exit portion 3 has a large surface area which is greater than the surface area of the light entry portion 2. The light exit portion 3 may notably have a dimension measured in the transverse direction of between 20 and 50 mm, while the light entry portion 2 may have a dimension measured in the longitudinal direction of between 30 and 500 mm.

The light entry portion 2 comprises a plurality of light entry faces 20, which are the faces of the light guide 1 via which the light rays enter this light guide 1. Likewise, the light exit portion 3 comprises a plurality of light exit faces 30 via which the rays of light exit the light guide 1. Because of the bent portion 11, the light entry faces 20 and the light exit faces 30 are, in the embodiment illustrated in the figures, substantially parallel. Of course, this is merely one exemplary embodiment and the invention covers scenarios in which the light entry faces 20 and the light exit faces 30 are inscribed in planes that are intersecting, in their entirety or along a tangent to these faces.

According to the invention, the light entry portion 2 has at least one slot 12 positioned between two adjacent light entry faces 20. A groove 13 positioned between two light exit faces 30 extends in the continuation of this slot 12. Such a groove 13 extends along the light entry portion 2, and along the bent portion 11, and along the light exit portion 3.

In the embodiment illustrated in the figures, the light guide has a plurality of slots 12 and a plurality of grooves 13 in the continuation thereof. It will be appreciated here that the groove 13 extends along a first straight line, that the slot 12 extends along a second straight line, and that these straight lines are coincident. A plurality of the slots 12 and grooves 13 are positioned at regular intervals from one longitudinal end 101 to the other longitudinal end 102 of the light guide 1. According to the embodiment depicted in the figures, the slots 12 are substantially triangular, the bases of the triangles being positioned in the vicinity of the light entry faces 20 while the apexes of the triangles face toward the light exit faces 30, pointing to the groove 13 associated with the slot 12. Alternatively, the light guide 1 could have slots 12 in the form of parabolic cavities. The grooves 13, of which a cross section adopts the shape of a U or V, extend from the apexes of these triangles formed by the slots 12. The grooves 13 do not extend from one end of the light guide 1 to the other; they originate at one of their ends at the apex of the triangles formed by the slots 12, that is, at a distance from the light exit faces 20, and at the other of their ends there is a zone 4 without grooves 13 which is positioned in the continuation of the light exit portion 3.

The light guide 1 is made up of a series of strips 10 that are aligned in the longitudinal direction. Each strip 10 is delimited at least by a light entry face 20 and by a light exit face 30. Laterally, these strips 10 are delimited by two adjacent slots 12 in the light entry portion 2, and by two adjacent grooves 13 in the light exit portion 3.

The strips 10 do not all have the same shape. Most of the strips 10 are of substantially trapezoidal shape when viewed from the front, such a view being illustrated in FIG. 1. These two strips 10 widen, which means to say that their longitudinal dimension B is greater in the vicinity of the light exit face 30 than in the vicinity of the light entry face 20, when measured in the longitudinal direction of the light guide 1. Such a longitudinal dimension B, which corresponds to the width of the strips 10, is here measured between a given slot 12 and given groove 13, and the slot 12 and groove 13 which are adjacent to them, or one of the longitudinal ends 101 or 102. It will be appreciated that the measurement will be calculated from a slot 12 if it is made in the light entry portion 2, and from a groove 13 if it is made in the light exit portion 3.

The slots 12 are through-slots in that they pass through the light entry portion 2 from one side to the other, that is, from an upper face 21 of the light entry portion 2 to a lower face 22 of the light entry portion 2, this upper face 21 and this lower face 22 being connected by the light entry faces 20. Conversely, the grooves 13 are blind in that they do not pass through the light exit portion 3 from one side to the other. According to the invention, these grooves 13 extend over at least one third of a thickness E of the light exit portion 3, this thickness E being measured between the light exit faces 30 and a reflection face 31 of the light exit portion 3. Such a reflection face 31 is opposite the light exit faces 3. Thus, within the light guide 1, the light exit faces 30 of the light exit portion 3 are in the continuation of the upper face 21 of the light entry portion 2, while the reflection face 31 of the light exit portion 3 is in the continuation of the lower face 22 of the light entry portion 2. The bent portion 11 defines both the transition from the upper face 21 to the light exit faces 30 and the transition from the lower face 22 to the reflection face 31.

Two adjacent strips 10 are connected to each other by at most one third of the thickness E of the light exit portion 3. It will thus be appreciated that this section of the light exit portion 3 that connects the strips 10 complements the grooves 13 that contribute to the delimiting thereof.

The presence of slots 12 and of grooves 13 makes it possible to create, within the light entry portions 2 and light exit portions 3, air gaps that channel the rays of light emanating from a given light source 71 and entering the light guide 1 via the light entry face 20 of a strip 10, so that they are propagated over the entirety of the exit face 30 of this same strip 10. Such a configuration thus makes it possible to contain the rays of light emitted by a given light source 71 within a given strip 10.

FIG. 3 is a view from the rear of the light guide 1 according to the invention, showing a decoupling structure 6. This decoupling structure 6 is positioned on the reflection face 31. It will thus be appreciated that it is not present on the lower face 22 of the light entry portion 2. Likewise, a region 9 positioned in the continuation of the reflection face 31 has no decoupling structure 6. Finally, vertical strips 32 of the reflection face 31, which are aligned with the grooves 13 positioned between the exit faces 30, are likewise free of decoupling structure 6.

This decoupling structure 6 is a device that makes it possible to modify the angle of incidence of the rays of light being propagated within the light guide 1. When these rays of light strike the decoupling structure 6, they are deflected so that they can be redirected toward the light exit faces 30.

The configuration of the decoupling structure 6 may differ, according to a number of embodiments. According to the embodiment depicted here, the decoupling structure 6 comprises prisms 60. This decoupling structure 6 may nevertheless comprise, as an alternative or in addition, spheres, graining, a diffractive structure, white paint. Some of these elements of the decoupling structure 6, particularly the prisms 60 and/or spheres, may be formed on the light guide 1 the time of molding thereof, the mold used therefore having domes that will form roughnesses in the light guide 1, such roughnesses corresponding to these prisms 60 and/or spheres. Likewise, the graining and the diffractive structure may be obtained by engraving of complementary shape in the mold.

The decoupling structure 6 is distributed over the reflection face 31, with a particular layout. Thus, the elements that form this decoupling structure 6, in this instance the prisms 60, are distributed in, on the one hand, a direction of elongation A of the strips 10 and, on the other hand, a direction P perpendicular to this direction of elongation A. It will therefore be appreciated that the distribution of the elements of the decoupling structure differs from one strip 10 to another, but also within the one same strip 10.

FIGS. 4 and 5 depict a lighting device 7 comprising a light guide 1 according to the invention, this lighting device 7 being illustrated in a perspective view, a view from above and a view from beneath, respectively.

This lighting device comprises, in addition to the light guide 1, a printed circuit board 70. This printed circuit board 70 bears light sources 71 from which the rays of light propagated within the light guide 1 originate. Such light sources 71 are positioned at regular intervals facing the light entry faces 20 of the light entry portion 2, each light source 71 corresponding to one light entry face 20. It will thus be appreciated that the direction of elongation A of a given strip 10, described hereinabove with reference to FIG. 3, corresponds to the mean direction of the ray of light emanating from the light source 71 positioned facing the light entry face 20 delimiting this strip 10.

The lighting device further comprises control members 72, of which there are two according to the embodiment depicted here. The control members 72 control the light sources 71 and therefore, by extension, the lighting of the light guide 1.

The light sources 71 each comprise RGB light-emitting diodes, such diodes making it possible to emit red, green or blue light rays. However, it is possible to illuminate the light guide 1 with white light, by mixing the rays of light emanating from these RGB light-emitting diodes. However, such an operation requires a certain propagation distance for the light rays, this distance being necessary for the mixing of the colors. In this regard, the light guide 1 has, on the upper face 21 of the light entry portion 2, a mixing means 5. This mixing means 5 is configured to mix the light rays emitted by the light sources 71 and entering via the light entry faces 20.

The mixing means 5 here comprises bands 50 which are lined up in succession starting from these light entry faces 20, and extend from one lateral end of the strips 10 to the other. These bands 50, when viewed from the outside of the light guide 1, are concave or convex, such a shape allowing optimal mixing of the light rays within the light entry portion 2.

The light guide 1 also has a centering pin 73 for centering the printed circuit board 70, such a centering pin 73 projecting from the lower face 22 of the light entry portion 2. The centering pin 73, according to the embodiment depicted here, is a shank bent over at a right angle, a first part of the shank extending in a vertical direction, and a second part of the shank extending in a transverse direction. This centering pin 73, which can particularly be seen in FIG. 5, ensures the correct positioning of the printed circuit board 70 relative to the light guide 1. To this end, the centering pin 73 is inserted into a corresponding orifice passing through the printed circuit board 70 from one side to the other.

The light guide 1 according to the invention is intended to light a motor vehicle passenger compartment. To this end, the light guide 1 may be integrated into a lighting device 7 as described hereinabove, this lighting device 7 itself being able to be inserted into a motor vehicle interior panel 8. Such a vehicle interior panel 8 is depicted in FIG. 6. This panel 8 may, for example, be the panel of a door-leaf, or similar, of the vehicle, or the panel forming part of an instrument panel, or a roof, or a floor, etc. of the vehicle.

According to the invention, the vehicle interior panel 8 comprises a support 80 and a trim 81, this trim being depicted here in dotted line. The light guide 1 comprises fastening means 82 for securing to the support 80, these means consisting here of extensions of the zone 4 at the ends thereof. These fastening means 82 extend from the light guide 1 in the longitudinal direction. The fastening means 82, for example fastening tabs provided with eyelets, facilitate the securing of the light guide 1 to the motor vehicle on which it is to be provided, and more particularly to the support 80 of the panel 8.

The lighting device 7 is intended to be positioned between the support 80 and the trim 81, the light entry faces 20 and the reflection face 31 facing the support 80, while the light exit faces 30 face the trim 81. More particularly, the light exit portion 3, the light exit faces 30 and part of the zone 4 are covered by the trim 81.

This trim 81 may, for example, take the form of an insert made of fabric or leather, or any other decorative element, these materials being treated so as to allow rays of light to pass through. The trim 81 comprises at least one pattern. When at least one of the light sources 71 is illuminated, the rays of light being propagated within the light guide 1 exit same via the light exit faces 30 and pass through the trim 81, thus rendering the pattern visible.

The present invention thus proposes a light guide that offers uniform lighting over the entirety of that surface of this light guide that is intended to extract the rays of light, and at the same time contributes to preventing light from being propagated outside of this surface.

However, the present invention is not limited to the means and configurations described and illustrated here, and it also extends to any equivalent means and configurations, as well as to any technically operative combination of such means.

The invention claimed is:

1. A light guide for lighting a motor vehicle passenger compartment, comprising a light entry portion and a light exit portion, the light entry portion comprising at least two light entry faces and the light exit portion comprising at least two light exit faces, this light guide being wherein the light entry portion has at least one slot positioned between two light entry faces, a groove separating two light exit faces extending in the continuation of this slot,
   wherein the light guide further comprises a succession of strips, each strip being delimited by a light entry face and at least one light exit face, at least one strip widening from the light entry face toward the light exit face,
   wherein the light guide further comprises a plurality of grooves, the grooves extending over at least one third of a thickness of the light exit portion from the light exit face, the thickness being measured between the light exit face and a reflection face of the light exit portion that is opposite to the light exit face, the light exit face being opposite to a reflection face, the reflection face having a decoupling structure, or
   wherein the light guide further comprises a plurality of slots that are in a form of parabolic cavities, each parabolic cavity positioned between two light entry faces, or are substantially triangular, each triangular slot having a base positioned closer to the light entry faces than to the light exit faces and an apex facing toward the light exit faces.

2. The light guide as claimed in claim 1, further comprising the succession of strips, each strip being delimited by the light entry face and the at least one light exit face, wherein at least one strip widens from the light entry face toward the light exit face.

3. The light guide as claimed in claim 1, comprising a bent portion between the light entry portion and the light exit portion.

4. The light guide as claimed in claim 1, comprising a plurality of slots, each one positioned between two light entry faces, these slots being positioned at regular intervals in a main direction of elongation of the light guide.

5. The light guide as claimed in claim 1, further comprising the plurality of grooves, the grooves extending over at least one third of the thickness of the light exit portion, the thickness being measured between the light exit face and a reflection face of the light exit portion that is opposite to the light exit face, the light exit face being opposite to a reflection face, the reflection face having a decoupling structure.

6. The light guide as claimed in claim 1, wherein at least one slot passes through the light entry portion from an upper face of the light entry portion to a lower face of the light entry portion, this upper face and this lower face being joined by the light entry face.

7. The light guide as claimed in claim 1, wherein the slots and the grooves delimit strips, at least two adjacent strips being connected by at most one third of the thickness of the light exit portion.

8. The light guide as claimed in claim 1, having a zone that is free of grooves and extends in a continuation of the light exit portion.

9. The light guide as claimed in claim 1, wherein, within the light entry portion, the light entry face connects an upper face and a lower face, this upper face of the light entry portion having a mixing means configured to mix the rays of light entering via the light entry face.

10. The light guide as claimed in claim 9, wherein the mixing means comprises a succession of bands which, when viewed from the outside of the light guide are concave or convex, and are lined up in succession starting from the light entry face.

11. The light guide as claimed in claim 1, wherein the decoupling structure comprises at least a plurality of prisms and/or plurality of spheres and/or a graining and/or a diffractive structure and/or white paint.

12. A lighting device comprising a printed circuit board which bears a plurality of light sources, each of the light entry faces of a light guide as claimed in claim 1 being positioned facing at least one light source.

13. The lighting device as claimed in claim 12, wherein at least one of the light sources comprises RGB light-emitting diodes.

14. A motor vehicle interior panel comprising a support and a trim, a lighting device as claimed in claim 12 being positioned between this support and this trim, the light exit portion of the light guide being positioned facing the trim.

15. The motor vehicle interior panel as claimed in claim 14, wherein the trim has at least one pattern rendered visible by illuminating at least one of the light sources.

16. The light guide as claimed in claim 2, comprising a bent portion between the light entry portion and the light exit portion.

17. The light guide as claimed in claim 2, comprising a plurality of slots, each one positioned between two light entry faces, these slots being positioned at regular intervals in a main direction of elongation of the light guide.

18. The light guide as claimed in claim 1, further comprising the plurality of slots that are in the form of parabolic cavities, each parabolic cavity positioned between two light entry faces, or are substantially triangular, each triangular slot having a base positioned closer to the light entry faces than to the light exit faces and an apex facing toward the light exit faces.

* * * * *